(12) United States Patent
Feisst et al.

(10) Patent No.: US 9,110,165 B2
(45) Date of Patent: Aug. 18, 2015

(54) MEASURING DEVICE OF PROCESS AUTOMATION TECHNOLOGY FOR ASCERTAINING AND MONITORING A CHEMICAL OR PHYSICAL PROCESS VARIABLE IN A HIGH TEMPERATURE PROCESS IN A CONTAINER

(75) Inventors: Klaus Feisst, Stegen (DE); Eric Bergmann, Steinen (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 460 days.

(21) Appl. No.: 13/390,774

(22) PCT Filed: Jul. 21, 2010

(86) PCT No.: PCT/EP2010/060519
§ 371 (c)(1),
(2), (4) Date: Mar. 16, 2012

(87) PCT Pub. No.: WO2011/020668
PCT Pub. Date: Feb. 24, 2011

(65) Prior Publication Data
US 2012/0186339 A1  Jul. 26, 2012

(30) Foreign Application Priority Data

Aug. 18, 2009 (DE) .......................... 10 2009 028 620

(51) Int. Cl.
*G01S 13/88* (2006.01)
*G01F 23/284* (2006.01)
(Continued)

(52) U.S. Cl.
CPC .............. *G01S 13/88* (2013.01); *G01F 23/284* (2013.01); *G01S 7/032* (2013.01); *H01Q 1/002* (2013.01); *H01Q 1/225* (2013.01); *H01Q 13/02* (2013.01); *H01Q 13/24* (2013.01)

(58) Field of Classification Search
CPC ... G01F 23/284; G01F 23/2845; G01F 23/00; G01F 23/0061; G01F 23/296; G01S 13/88; G01S 7/032; H01Q 1/225; H01Q 1/002; H01Q 13/24; H01Q 13/02
USPC ..................... 73/290 R, 290 V, 1.73; 342/124
See application file for complete search history.

(56) References Cited

U.S. PATENT DOCUMENTS 5,560,511 A * 10/1996 McNerney .................... 220/327
7,255,002 B2 * 8/2007 Gravel et al. ................ 73/290 V
(Continued)

FOREIGN PATENT DOCUMENTS

DE          100 64 812 A1      6/2002
DE    WO 2009129997 A1 * 10/2009 .............. G01F 2/284
(Continued)

OTHER PUBLICATIONS

English translation of IPR.
(Continued)

*Primary Examiner* — Hezron E Williams
*Assistant Examiner* — Marrit Eyassu
(74) *Attorney, Agent, or Firm* — Bacon & Thomas, PLLC

(57) ABSTRACT

An apparatus forming a measuring device for ascertaining and monitoring a chemical or physical process variable in a high temperature process in a container, wherein the measuring device is formed from at least a sensor element located in the process and at least a measurement transmitter located outside the process. At least a first sealing element is provided for sealing against penetration of process medium into the sensor element. The sensor element has a boundary location between a first sensor element region, which faces the process and which is embodied with a high thermal resistance, and a second sensor element region, which faces away from the process and which has a low thermal resistance, and that the temperature sensitive element is arranged in the sensor element at the boundary location.

12 Claims, 4 Drawing Sheets

(51) Int. Cl.
*G01S 7/03* (2006.01)
*H01Q 1/00* (2006.01)
*H01Q 1/22* (2006.01)
*H01Q 13/02* (2006.01)
*H01Q 13/24* (2006.01)

(56) References Cited

U.S. PATENT DOCUMENTS

2002/0080080 A1  6/2002  Kloefer
2003/0201842 A1*  10/2003  Gard ........................... 333/24 R
2005/0253751 A1*  11/2005  Feisst et al. ................... 342/124
2007/0008212 A1  1/2007  Serban
2008/0134778 A1*  6/2008  Osswald et al. ................ 73/304
2008/0303710 A1*  12/2008  Kienzle et al. ................ 342/124
2009/0212996 A1*  8/2009  Chen et al. .................... 342/124

FOREIGN PATENT DOCUMENTS

EP         1734348 A1  12/2006
WO  WO 2009/129997 A1  10/2009

OTHER PUBLICATIONS

German Search Report.

* cited by examiner

MEASURING DEVICE OF PROCESS AUTOMATION TECHNOLOGY FOR ASCERTAINING AND MONITORING A CHEMICAL OR PHYSICAL PROCESS VARIABLE IN A HIGH TEMPERATURE PROCESS IN A CONTAINER

TECHNICAL FIELD

The present invention relates to a measuring device of process automation technology for ascertaining and monitoring a chemical or physical process variable in a high temperature process in a container, wherein the measuring device is formed from at least a sensor element located in the process and at least a measurement transmitter located outside the process, wherein at least a first sealing element is provided for sealing against penetration of the process medium into the sensor element.

BACKGROUND DISCUSSION

Measuring devices are frequently used in automation and process control technology to ascertain a process variable, e.g. flow, fill level, pressure and temperature or some other physical and/or chemical process variable in a process flow. The assignee is active in the field of industrial automation and process control technology and produces industrial measuring devices and field devices. It sells these field devices, for example, among other things for fill level determination of a medium in a container, under the marks MICROPILOT, LEVELFLEX or DELTAPILOT.

One known measuring method among a large number of measuring methods for ascertaining the fill level in a container is the travel time measuring method. In the case of this measuring method, microwaves, for example, are transmitted via an antenna apparatus, and the echo waves reflected off the surface of the medium are detected, wherein the travel time of the measurement signal is a measure for the traveled distance. From half of the travel time, the fill level of the medium in a container can accordingly be ascertained. The echo curve represents, in such case, the total signal route as a function of time, wherein each measured value of the echo curve corresponds to the amplitude of an echo signal reflected off a surface at a particular distance. The travel time measuring method is essentially divided into two methods of ascertainment: In the case of time difference measurement, the time is ascertained, which a broadband wave signal pulse requires for a traveled path. In the case of frequency difference measurement (FMCW—Frequency-Modulated Continuous Wave), the emitted, frequency-modulated high-frequency signal is compared with the reflected, received, frequency-modulated high-frequency signal. In the following, no restriction is made to a particular method of ascertainment.

In the case of certain process applications, the measuring devices or their sensor elements are exposed to extreme conditions, e.g. high temperatures, high pressures and/or chemically aggressive materials. Especially microwave fill level measuring devices have temperature sensitive and/or pressure sensitive components, such as, for example, a measuring device electronics and transmitting and/or receiver elements for the microwaves.

In the high temperature range, predominantly aluminum oxide ceramic and/or synthetic materials resistant to high temperatures of up to 250° C., e.g. polyether ketones (PEEK), are used as temperature resistant material for process separation in the sensor element.

The process sealing of these process separation elements in the sensor element is, in the case of ceramics, most often implemented via soldering and/or graphite packing glands. In the case of use of synthetic materials as process separation elements, high temperature resistant, fluorine elastomers, such as, for example, perfluoro rubber (FFKM or FFPM), which are sold under the mark, Kalrez, are applied as sealing elements very near to the hot process.

In order to protect the measuring electronics in the measurement transmitter against high temperatures and pressures as well as against aggressive chemical materials, the sensor elements are hermetically sealed on the process side with sealing elements. By inserting a hermetically sealed sealing element into the hollow conductor of a horn antenna, a largest possible degree of safety is assured, since a second "safety element" seals the process in the case of a detachment of the modular, measurement active parts—e.g. an in-coupling unit/exciter element or the measuring device electronics—from the measurement passive parts, such as e.g. the antenna, for reasons of maintenance or repair.

In US 2005/0253751 A1, a modular construction of a horn antenna is described. The process separating element is embodied in the shape of a ceramic matching cone, which is brought into the hollow conductor, sealed by graphite packing rings.

Of disadvantage in the cited examples of embodiments of process sealing of the sensor element or of its process connection against the medium located in the process according to the methods known from the state of the art is:
- that the soldering or glass melted closure of the process isolating element for sealing against the medium in the process is very complicated and expensive, and can only be applied in the case of ceramics;
- that graphite packing glands do not have the required quality of sealing, especially at high temperatures, since the permeation of process medium through the graphite packing gland is no longer negligible at higher temperatures; and
- that the elastomers are not resistant in the long term at temperatures >200° C., and with rising temperature, very rapidly display increasing aging phenomena and, as a result thereof, phenomena indicating lack of sealing.

SUMMARY OF THE INVENTION

An object of the invention is therefore to provide a measuring device with a safe sealing, which has a high thermal durability and is especially cost-effective and simple to manufacture.

This object is achieved by features including that a sensor element has a boundary location between a first sensor element region, which faces the process and which is embodied with a high thermal resistance, and a second sensor element region, which faces away from the process and which is embodied with a low thermal resistance, and that the temperature sensitive element is arranged in the sensor element at the boundary location.

In an advantageous form of embodiment of the solution of the invention, it is provided that at the boundary location, the ratio between the high thermal resistance in the first region of the sensor element and the low thermal resistance in the second region of the sensor element has at least the value two or greater.

An advantageous embodiment of the solution of the invention provides that the high thermal resistance in the first region of the sensor element is implemented via a geometry change by means of minimizing a first cross sectional area of the sensor element and/or increasing the length of the first region, and/or that the low thermal resistance in the second region of the sensor element is embodied via a geometry change by means of maximizing a second cross sectional area of the sensor element and/or reducing the length of the second region.

Another advantageous embodiment of the apparatus of the invention is to be seen in the fact that the first region and the second region of the sensor element are embodied as a single piece made of a material with a thermal conductivity.

A very advantageous variant of the solution of the invention is to be seen in the fact that the second region of the sensor element and the first region of the sensor element are formed by use of different materials with different thermal conductivities.

In a favorable embodiment of the apparatus of the invention, it is provided that at least one electrical plugged connection and/or an electronic component is embodied as a temperature sensitive element at the boundary location between the second region of the sensor element and the first region of the sensor element.

An advantageous embodiment of the solution of the invention is that at least a first sealing element is embodied as a temperature sensitive element at the boundary location between the second region of the sensor element and the first region of the sensor element.

An especially advantageous further development of the solution of the invention provides that a second sealing element is arranged at a distance of a fourth the wavelength from the first sealing element.

In a favorable embodiment of the apparatus of the invention, it is provided that at least the first sealing element and/or second sealing element is embodied as a low-temperature O-ring seal, for example made of fluorine rubber, fluorocarbon rubber, tetrafluoroethylene and/or perfluoro propylene.

In a favorable embodiment of the apparatus of the invention, it is provided that a third sealing element, especially a graphite packing gland, is provided on the sensor element in the vicinity of the process as a supplemental safety sealing element.

A very advantageous variant of the solution of the invention is to be seen in the fact that the sensor element is embodied as an antenna unit with at least one hollow conductor for determining the fill level of a medium in a container, wherein its hollow space at least partially is filled by a dielectric filling element, and that the sealing elements of the sensor element are embodied between the hollow conductor and the filling element.

An advantageous embodiment of the solution of the invention provides that the sensor element is embodied as a probe unit with at least one measuring probe for determining the fill level of a medium in a container, and that the sealing elements of the sensor element are embodied between the measuring probe and a coaxial process coupling.

The process seal, for example in the case of fill-level measuring devices, which ascertain the distance for the medium according to the travel time measuring method of microwaves, is usually arranged between the coupling of the coaxial signal guidance into the hollow conductor of the sensor element and the radiating element, e.g. a horn antenna of the sensor element. This process seal should prevent medium from the process from being able penetrate into the sensitive coupling structure and the measurement transmitter and/or escape into the environment. In such case, this hollow conductor in the sensor element serves not only for signal conveyance and as an accommodation for the sealing dielectric fill material, but also as a thermal decoupling between the hot process flange and the temperature sensitive electronics in the measurement transmitter housing. The heat flux between the process and the environment via the sensor element and measurement transmitter housing can be represented as a simple series connection of thermal resistances. This series connection of resistances is shown in FIG. 3.

The well-known problem, that the known methods for sealing the process isolating element in the hollow conductor of a sensor element of a microwave fill level measuring device exhibit sealing problems in the case of temperatures above 200° C., and/or, like the soldering or the glass bonding of the process isolating element, are only applicable in limited circumstances, is solved according to the invention by at least one sealing element being placed in the sensor element at a position, at which, due to strong geometric or material changes, a jump in thermal resistance occurs. This boundary location between a first region between the seal and process with a high thermal resistance and the second region between the seal and environment or measurement transmitter housing with a low thermal resistance is achieved, for example, by means of a strong cross sectional change of the sensor element or of the process connection. The thermal resistance via the measurement transmitter housing to the environment is, as a rule, known, and changes only slightly.

The advantages of the invention as compared to the state of the art include:
  that the sealing elements—and thus the sensor elements—have a lengthened lifetime and lower leak rates due to the reduced effective temperature,
  that, by reducing the temperature in the region of the seal, cost-effective and proven materials for sealing elements can be made use of, and
  that high temperature plastics, such as, for example, polyetherether ketones (PEEK), which, according to the current state of knowledge, cannot be sealed by means of soldering or by means of a graphite packing glands, are applicable.

BRIEF DESCRIPTION OF THE DRAWINGS

Other details, features and advantages of the subject matter of the invention will become evident from the following description and the associated drawing, in which preferred examples of embodiments of the invention are presented. For better perspicuity and for purposes of simplification, the components or assemblies of components of the examples of embodiments illustrated in the figures, which correspond in their construction and/or in their function, are provided with the same reference characters. The figures of the drawing show as follows.

DETAILED DISCUSSION IN CONJUNCTION WITH THE DRAWINGS

Figure 1:
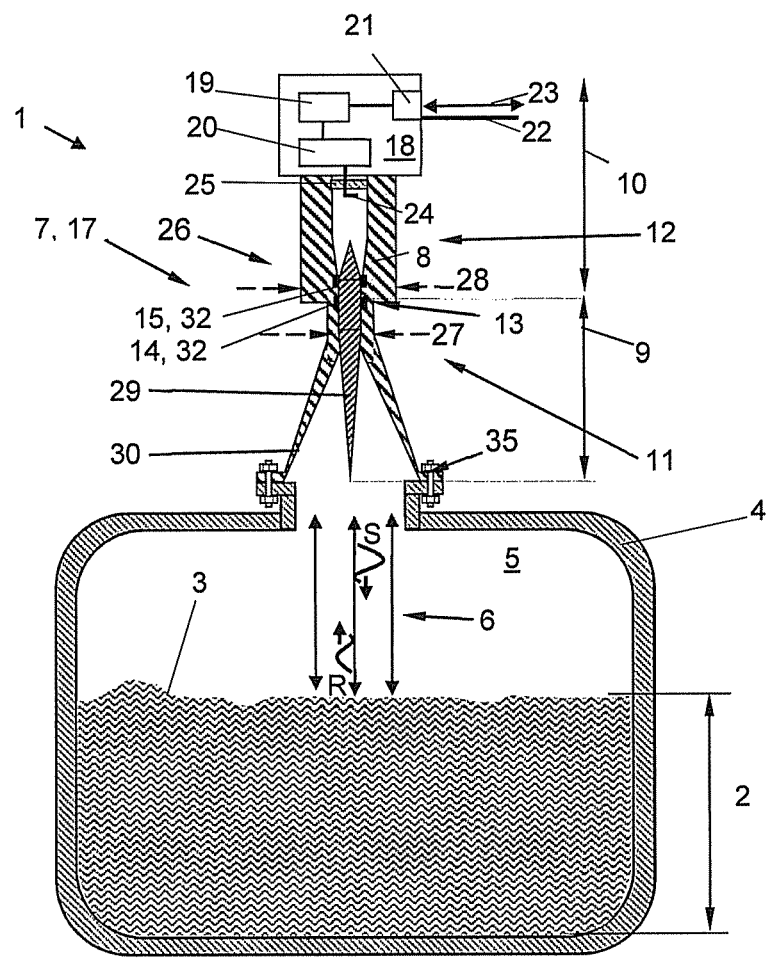
FIG. 1 is a schematic representation of a first example of an embodiment of a fill-level measuring device of process measurements technology with an antenna unit serving as sensor element.

FIG. 1 shows a first example of an embodiment of a measuring device 1 of the invention for process measurements technology. This measuring device 1 is applied, for example, for ascertaining the fill level 2 of a medium 3 in a container 4.

The sensor element 17 of the measuring device 1 is arranged on the container 4 and is in contact with the process 5, while the measurement transmitter 18 is arranged outside the process. Sensor element 17 is exposed in high temperature processes 5, at least in certain regions, to process temperatures of several hundred degrees Celsius. In general, one should strive to accommodate the high temperature sensitive parts of the measuring device 1, such as, for example, the electronics, outside the process 5 and in the measurement transmitter 18. However, in some cases, it is also necessary to accommodate some temperature sensitive elements 32 in the sensor element 17 quite near to the process. Examples of such temperature sensitive elements 32 are sealing elements 14, 15 for process sealing, electrical plug connections and/or electronic components, such as, for example, signal preamplifiers for amplification of the measurement signal 6, or optocouplers for galvanic isolation.

According to the invention, the sensor element 17 has a boundary location 13 between a first region 9, which faces the process 5 and has a high thermal resistance 11, and a second region 10, which faces away from the process 5 and has a low thermal resistance 12. At this boundary location 13 in the sensor element 17 is the temperature sensitive element 32, such as, for example, a sealing element embodied in the form of a low-temperature O-ring sealing element 14, 15 of FIG. 1 and FIG. 2. This temperature sensitive element 32 can also be arranged at a slight distance from the boundary location 13.

The ratio at the boundary location 13 between the high thermal resistance 11 in the first region 9 of the sensor element 17 and the low thermal resistance 12 in the second region 10 of the sensor element 17 amounts, for example, to at least two. The difference between the thermal resistances 11, 12 can be achieved, for example, via two different procedures, which can be executed concurrently or individually:

As a first procedure, for example, a geometry change is effected at the boundary location 13 of the sensor element 17. For this, the difference in the thermal resistances 11, 12 is achieved, for example, by means of minimizing of the first cross sectional area 27 of the sensor element 17 and/or increasing the length of the first region 9, as well as by means of maximizing the second cross sectional area 28 of the sensor element 17 and/or reducing the length of the second region 10. In such case, the sensor element 17 is embodied as a single piece made of a material with a fixed thermal conductivity.

Another procedure is to provide a material change or material modification at the boundary location 13, so that the second region 10 of the sensor element 17 and the first region 9 of the sensor element 17 are embodied with different thermal conductivities by the use of different materials.

The fill-level measuring device 1 is basically composed of a sensor element 17 with an antenna unit 7 and a measurement transmitter 18. In this example of an embodiment, the antenna unit 7 or the sensor element 17 have a dielectric filling element 29 as a process separating element in the hollow conductor 8. The fill level measuring device 1 ascertains—for example, according to the travel time measuring method—the fill level 2 of a medium 3 or of a fill substance in a container 4. In this example of an embodiment, the antenna unit 7 is embodied as a horn antenna, which can be subdivided into two basic functional units—the process coupling 26 and the radiating element 30.

In industrial measurements technology, in principle, dielectric rod antennas, parabolic antennas, planar antennas and horn antennas are used as radiating elements 30 for sending and/or receiving freely radiated microwave measurement signals. Typically, especially in the case of antenna units 7 with horn antennas and rod antennas, a pot-shaped housing is used as process coupling 26, which has the geometry of a short-circuited hollow conductor 8. Into this process coupling 26, an exciter element 24 is inserted, via which microwaves 6 are sent and/or received through the hollow conductor 8. In the case of a horn antenna, adjoining on the hollow conductor 8 is a funnel-shaped radiating element 30 widening in the direction facing toward process 5. In the case of the rod antenna, a rod pointing into the container 4 and made of a dielectric is provided as a radiating element 30. Usually, the inner space of the hollow conductor 8 is almost completely filled by a dielectric filling element 29. In the case that the horn antenna serves as radiating element 30, the filling element 29 includes a cone shaped matching element pointing into the container 4 or toward the process 5. In the case of rod antennas, the dielectric filling element 29 in the hollow conductor 8 is led as a conical, rod-shaped antenna unit 7 further into the process 5.

Due to the dimensioning of the hollow conductor 8 and the dielectric constant of the dielectric filler body 29 serving as the process separating element, only certain modes are capable of propagation in the hollow conductor 8 or the antenna unit 7. In the field of fill-level measurements, preferably modes with a radiation characteristic in the form of a marked forwards lobe are applied. In the case of round hollow conductors, the preferred mode is the transverse electric TE11 mode.

In the measurement transmitter 18, a transmitting/receiving unit 20 is provided, in which the microwave measuring signals are produced. Via a coupling element 24, the microwave measuring signals 6 are coupled into the hollow conductor 8. The coupling element 24 is installed in a gas diffusion blocking and electrically insulated manner via a glass feedthrough 25 into the hollow conductor 8, which is most often made of metal. The microwave measuring signals 6 coupled into the hollow conductor 8 of the antenna unit 7 are radiated with a predetermined radiation characteristic as sent signals S from the radiating element through a dielectric filling element 29 into the process space 5. Most often, a radiation characteristic of the microwave measuring signals 6 with a planar wavefront is desired, in order to avoid travel time differences in the reflection signals R. The microwave measuring signals 6 transmitted into the process 5 are reflected off the surface of the medium 3 and, after a certain travel time, are received back by the transmitting/receiving unit 20. Via the travel time of the microwave measuring signals 6, the fill level 2 of the medium 3 in the container 4 is determined.

The control/evaluation unit 19 in the measurement transmitter 18 has the task of evaluating the received reflection signal R of the microwave measurement signal 6. The measurement signal 6 is further processed via signal processing means and special signal evaluation algorithms to an echo curve, and, therefrom, the travel time and, respectively, the fill level 2 are determined.

The control/evaluation unit 19 communicates via a communication interface 21 with a remote control location and/or with additional fill-level measuring devices 1, which are not explicitly shown. The fill-level measuring device 1 can be supplied via the supply line 22 with the required energy. An extra supply line 22 for energy supply of the fill level measuring device 1 is absent in the case of a so-called two-conductor measuring device, where communication and energy supply take place exclusively via the communication line 23 or fieldbus, and, thus, simultaneously via a two-wire line. The data transmission or communication via the fieldbus occurs, for example, according to the CAN, HART, PROFIBUS DP, PROFIBUS EMS, PROFIBUS PA or FOUNDATION FIELDBUS standard.

Via the introduction of the dielectric filler body 29 into the hollow conductor 8, the wave resistance of the coaxial conductor system is changed. In order to match this wave resistance, the hollow conductor 8 tapers especially in the matching region. For this, the dielectric filling element 29 includes in the direction of the in-coupling element 24 in the hollow conductor 8 a matching portion with a cone shape.

The dielectric filling element 29 furthermore provides the advantage that the electronics and the measurement transmitter 18 can be taken off, since, in a first safety stage, the measurement inactive parts of the antenna unit 7, such as, for example, a (not explicitly shown) flange plating of the filling element 29, seal the process, and additional sealing elements (14, 15, 16) form another or a second safety stage (second line of defense). In this way, in the case of an alteration or repair of the fill-level measuring device 1, an option is to mount the measurement transmitter 18 on the antenna unit 7 in the presence of a sealed process 5. Depending on embodiment and application, the fill-level measuring device 1 can be composed of different modules, so that, for example, an alteration of the fill-level measuring device 1 to have another type of coupling, e.g. stepped or pin in-coupling, or another frequency, e.g. 6 GHz or 26 GHz, is possible due to the possibility of separating the active parts from the passive parts while the process is sealed.

It is standard practice in high temperature applications of fill level measuring technology that a temperature resistant and microwave transmissive material, for example, aluminum oxide ceramic, boron nitride ceramic or polyetheretherketone synthetic material, or plastic, is used as dielectric filling element 29.

Due to the dimensioning of the hollow conductor 8 and the dielectric constant of the dielectric filler body 29, only certain fundamental modes, e.g. TE11, are capable of propagation. For fill-level measurements, preferably modes with a radiation characteristic in the form of a marked forwardly extending lobe are to be used; in the case of round hollow conductors, for example, the transverse electric TE11 mode.

Figure 2:
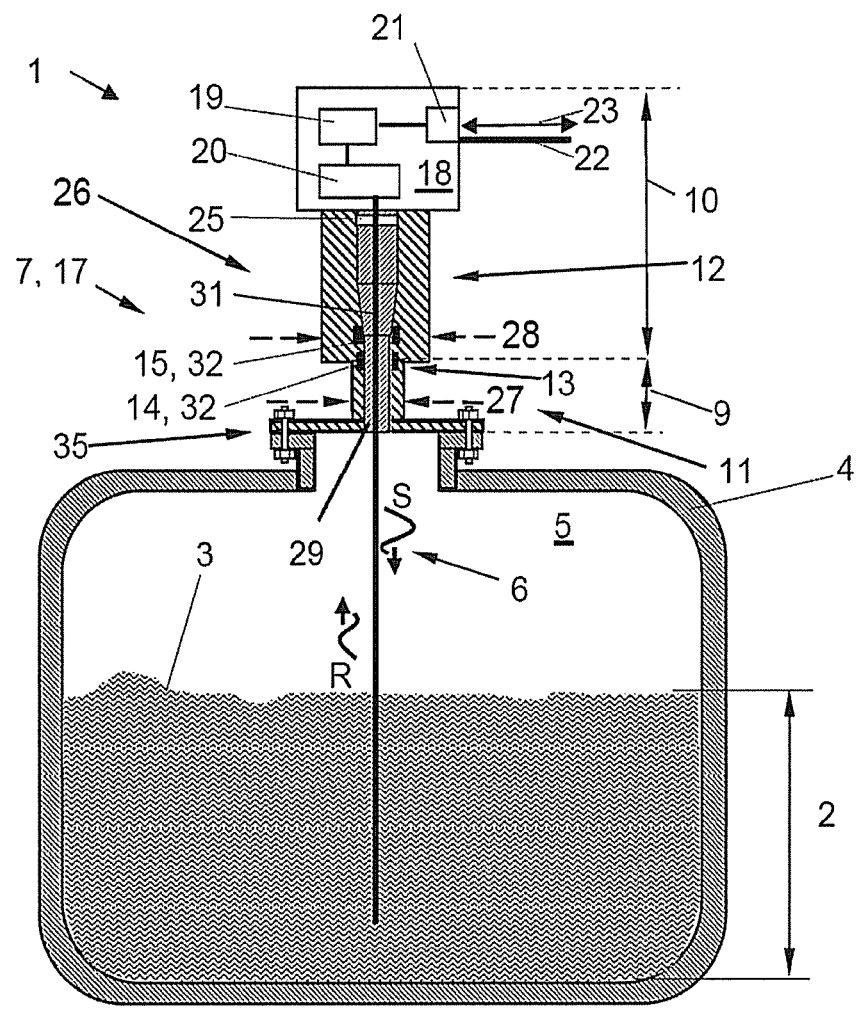
FIG. 2 is a schematic representation of a second example of an embodiment of a fill-level measuring device of process measurements technology with a measuring probe serving as sensor element.

FIG. 2 shows a second example of an embodiment of the fill-level measuring device of the invention 1 for process measurements technology, applied for ascertaining the fill level 2 in a container 4. In contrast to the embodiment of the solution of the invention shown in FIG. 1, here, a measuring probe 31 is used as sensor element 17. Thus, in the case of time domain reflectometry, such measuring probes 31 are applied, which do not freely radiate the microwaves into the process space 5, but instead guide the microwaves as measuring signals 6 along a conductive measuring probe 31.

In the case of a time domain reflectometer, the measuring probe 31 forms with the hollow conductor 8 a coaxial cable-like structure, whose hollow spaces are filled with a dielectric filling element 29.

Furthermore, such a construction of the sensor element 17 with a measuring probe 31 can be applied in fill-level measuring devices 1, which work according to a capacitive and/or conductive, measuring principle.

In the examples of embodiments in FIG. 1 and FIG. 2, according to the invention, at at least one boundary location 13 in the hollow conductor 8, at least a first sealing element 14 is arranged as a microwave-process seal between the coupling element 24 of the coaxial signal guidance in the hollow conductor 8 and the radiating antenna unit 7, e.g. a horn antenna. This first sealing element 14 should prevent the medium 3 or condensate from being able to penetrate into the hollow conductor 8, and thereby changing the propagation characteristics of the microwaves in the hollow conductor 8 and influencing the radiative characteristic.

For increasing the safety of the sealing of the coaxial process coupling 26, these sealing elements are often embodied multiple times in the sensor element 17. In addition to the first sealing element 14, in these cases, from a safety point of view, a second sealing element 15 and/or a third sealing element 16 are/is embodied between the inner wall of the hollow conductor 8 and the filling element 29.

The first sealing element 14 is also applied in the case of additional types of antenna units 7, e.g. rod antennas, planar antennas, parabolic antennas, and in measuring systems of time-domain reflectometry, which work with a microwave guided on a waveguide, e.g. measuring probe 31.

The hollow conductor 8 of the antenna unit 7 serves not only for guiding the signal and for seating the sealing, dielectric, filling element 29, but also as a thermal decoupling between the hot process flange located in the high temperature process 5, or antenna unit 7, and the temperature sensitive measurement transmitter 18, including electronics of the control/evaluation unit 19, transmitting/receiving unit 20 and communication interface 21.

As sealing elements 14, 15, O-ring seals designed for low temperatures of a maximum of 200° C. and made, for example, of fluorine rubber, fluorocarbon rubber, tetrafluoroethylene and/or perfluoro propylene are used. These sealing elements 14, 15 seal the possible hollow space between the hollow conductor 8 and the dielectric filling element 29, as well as between the dielectric filling element 29 and the measuring probe 31.

As already mentioned, according to the invention, the temperature problem is solved in such a manner, that the thermal resistance between the sealing elements 14, 15 and process 5 is selected so as to be large as possible, and, at the same time, that thermal resistance between the sealing element and measurement transmitter or environment is selected so as to be as small as possible. The thermal resistance of the measurement transmitter is, as a rule, predetermined and not changeable.

The implementation of the solution of the problem is achieved, as already previously mentioned, by corresponding length changes and cross section changes 27, 28 in the first region 9 and/or in the second region 10 of the hollow conductor 8 while taking into consideration special pressure and temperature specifications of the sensor element 17. Thus, taking into account the special pressure and temperature specifications, it is understood that, for example, in the case of the hollow conductor 8 in the first region 9, the first cross sectional area 27 is reduced only to such a degree, that it still withstands the maximal pressure values and maximal temperatures prescribed in the specification of the measuring device 1, taking into consideration margins of safety and that it is not deformed.

In addition to the first sealing element 14, a second sealing element 15 can, for example, be provided as an additional process seal in the sensor element 17. This second sealing element 15 is, in the case of application in a hollow conductor 8 of a fill-level measuring device 1, emplaced at a distance of a fourth of the wavelength of the microwave measurement signal 6 from the first sealing element 14.

These two sealing elements 14, 15 are designed, for example, as low-temperature O-ring seals made of fluorine rubber, fluorocarbon rubber, tetrafluoroethylene and/or perfluoro propylene. These elastomers are not resistant in the long term in the temperature range >200° C. Thus, they very rapidly exhibit aging phenomena in this temperature range, and, as a result thereof, begin to exhibit phenomena indicating lack of sealing. Via the embodiment of the invention of the sensor element 17 with a boundary location 13 between a high thermal resistance 11 in a first region 9 near to the process 5 and a thermal resistance at least two times lower in the second region 10, the temperature is very strongly reduced leading up to this boundary location 13.

For example, for a fill-level measuring device 1 with a frequency range of 26 GHz, a sensor element 17 with a dielectric filling element 29 made of the elastomer polyetheretherketone is embodied as a process separation in the hollow conductor 8. This material is specified for a maximum use temperature of 250° C. in the process 5.

Figure 4:
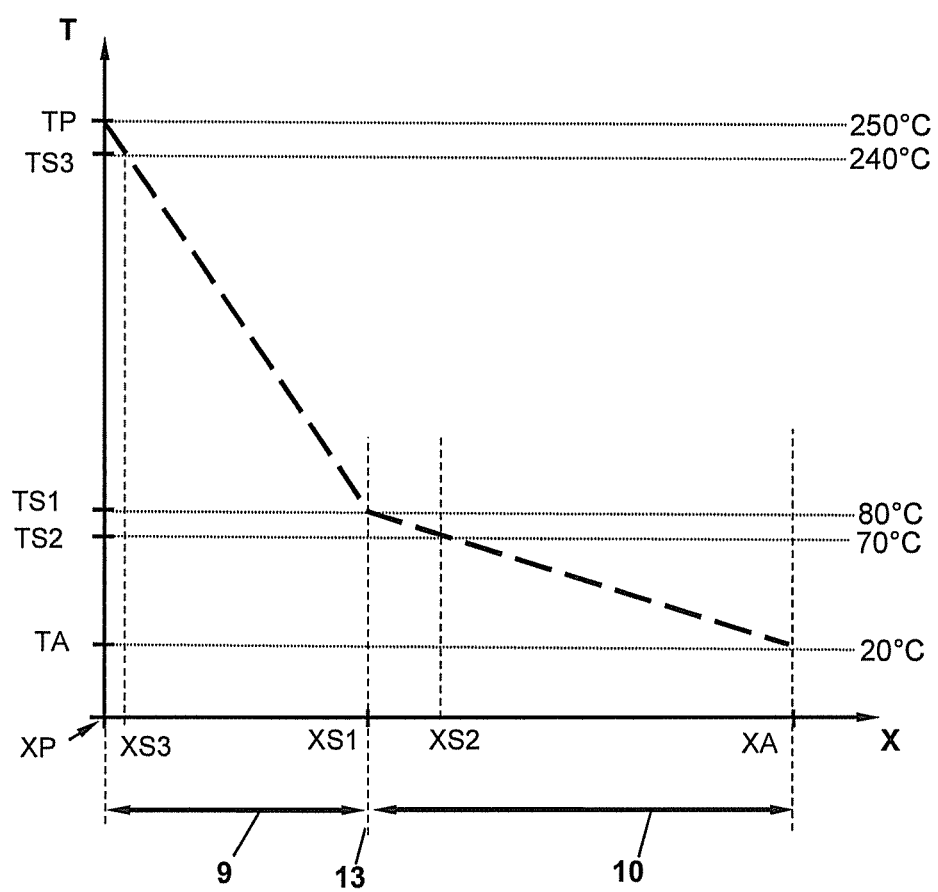
FIG. 4 is a schematic representation of a temperature profile of the sensor element of FIG. 3.

Via an optimized design of the hollow conductor 8, according to the invention, the temperature in the sealing region can be reduced to under 80° C. at the boundary location 13 between the first region 9 and second region 10 of the hollow conductor 8, which is separated by only 50 mm from the 250° C. hot process connection 35. This is shown in FIG. 4. In this way, the use of cost-effective elastomeric seals is possible, and the lifetime and sealing characteristics of the O-rings are significantly improved. Moreover, the sensor element 17 can be embodied in a much more compact construction, since the length of the first region 9 is shortened by this embodiment.

Furthermore, as a third sealing element 16 in the vicinity of the process 5 on the sensor element 17, an additional high temperature resistant sealing element can be provided, especially a graphite packing gland. This third sealing element 16 prevents medium 5 from entering into the gap between hollow conductor 8 and dielectric filling element 29 in the first region 9. However, these graphite packing glands do not completely sealed at high temperatures, since the permeation of process medium through the graphite packing gland is then no longer negligible. In spite of this, this third sealing element 16 prevents the medium 3 from penetrating unimpeded into a possible gap between dielectric filling element 29 and hollow conductor 8 in the first region 9 and bringing about disturbances in the propagation of the measurement signal 6 or a chemical attack on the elastomeric seals 14, 15.

Figure 3:
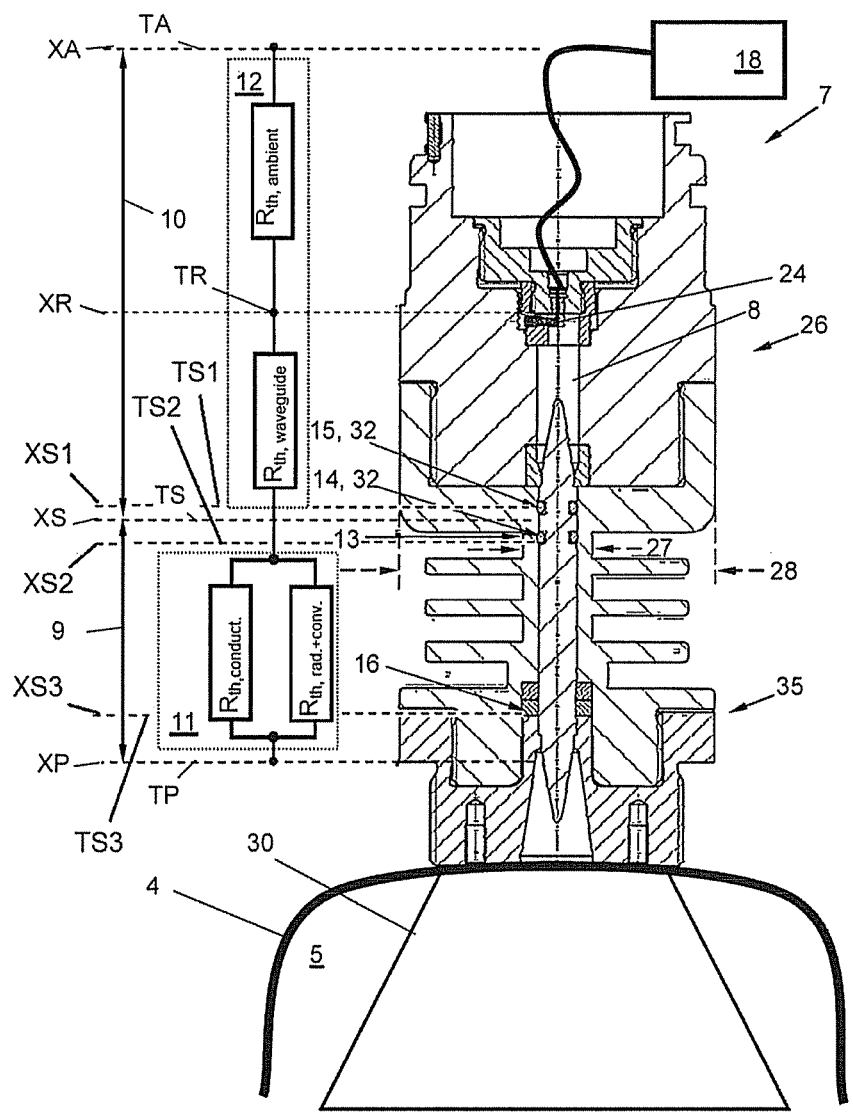
FIG. 3 is a schematic representation of a sensor element of the invention for the first example of an embodiment of a fill-level measuring device of process measurements technology with an antenna unit of FIG. 1.

FIG. 3 shows a schematic representation of a sensor element 17 of the invention of the first example of an embodiment of a fill-level measuring device 1 of process measurements technology with a horn antenna as radiating element 30 of the antenna unit 7 of FIG. 1.

The antenna unit 7 is mounted via a process connection 35 on the container 4, and connected with the radiating element 30, especially a horn antenna. The microwave measuring signals 6 are guided from the measurement transmitter 18 over a coaxial line to the coupling element 24 and transmitted into the hollow conductor 8. The hollow conductor 8 is at least partially filled with a dielectric filling element as a process separating element. For matching the wave resistances in the non-filled and filled hollow conductor 8, matching elements, for example in the form of impedance matching cones on the dielectric filling element 29, are provided in both directions.

The dielectric filling element 29 is mounted in sealed manner in the hollow conductor 8 by means of at least of a first sealing element 14. According to the invention, the sensor element 17 has at the first sealing position XS1 of the first sealing element 14 a boundary location 13 between a first region 9 with a high thermal resistance 11 and a second region 10 with a low thermal resistance 11. The first region 9 facing the process 5 is embodied in such a manner that the first cross section 27 of the sensor element 7 is lessened, while still taking into consideration the temperature and pressure specifications of the measuring device 1. The reducing of the first cross section 27 can only be performed to such a degree that the sensor element 17 still withstands any high process pressures. By means of the reduction of the first cross section 27, an increasing of the thermal resistance 11 is thus achieved in this first region 9. The additional, circularly shaped cooling lamellae have in such case only a small influence on the temperature reduction in this region, and are for the most part subject to design aspects. A further increasing of the thermal resistance 11 is also additionally achieved by a lengthening of the first region 9. In the second region 10, after the boundary location 13, the second cross sectional area 28 of the sensor element 17 is broadened to the largest possible extent, whereby an abrupt lowering of the thermal resistance 12 is achieved. This difference in the thermal resistances 11, 12 can supplementally or solely be achieved by a change in the material, wherein the materials then have different thermal conductivities. The high thermal resistance 11 in the first region 9 should be designed so as to be at least twice as large in comparison to the low thermal resistance 10 in the second region 12 of the sensor element 17. It is important that the two conditions, that the thermal resistance 11 in the first region 9 be as large as possible and the low thermal resistance 10 as small as possible, are simultaneously fulfilled.

Additionally, a second sealing element 15 can be inserted as a safety sealing element in the direction facing away from process 5, behind the first sealing element 14. If the seal geometry of the invention is applied in a fill-level measuring device 1, which ascertains the fill level by means of the travel time of microwave measurement signals 6, this second sealing element 15 is arranged at a distance of a fourth of the wavelength of the measurement signal 6 from the first sealing element.

Furthermore, a third sealing element 16 can be provided in the vicinity of the process 5, for example a graphite packing gland, whereby it is prevented that the medium 3 can penetrate into a possible gap between the dielectric filling element 29 and the hollow conductor 8 up to the first sealing element 14.

The heat flux between process 5 via the sensor element 17 and via the measurement transmitter 18 to the environment can be represented as a simple series and parallel circuit connection of thermal resistances $R_{th}$.

In the first region 9, the high thermal resistance 11 comprises a parallel circuit of the heat resistance of the thermal conduction $R_{th,\ conduct}$ and of the heat resistance of the heat radiation and convection $R_{th,\ rad+conv}$.

In the second region 10, the low thermal resistance 12 can be represented by a series circuit of the heat resistance in the hollow conductor $R_{th,\ waveguide}$ and of the heat resistance via the measurement transmitter to the environment $R_{th,\ ambient}$.

Via these thermal potential dividers of the thermal resistances $R_{th}$, the following formula holds for the maximum temperature TS1 at the first sealing element 14:

$$TS1 = TP - (TP - TA) \cdot \frac{\left(\frac{R_{th,conduct.} \cdot R_{th,rad+conv.}}{R_{th,conduct.} + R_{th,rad+conv.}}\right)}{R_{th,ambient} + R_{th,waveguide} + \left(\frac{R_{th,conduct.} \cdot R_{th,rad+conv.}}{R_{th,conduct.} + R_{th,rad+conv.}}\right)}$$

The maximum process temperature TP and the maximum ambient temperature TA must be known for the calculation.

Via the embodiment of the sensor element 17 according to the invention, a minimizing of the temperature in the sealing region coupled with simultaneously compact construction and good HF-performance is achieved.

FIG. 4 shows a schematic representation of a temperature profile of the sensor element 17 of FIG. 3. On the abscissa, the position X of the individual measuring points of the temperature T is plotted, and on the ordinate, the temperature associated therewith is displayed.

Proceeding from the process position XP with the process temperature TP of, for example, 250 degree Celsius, the temperature T sinks to the boundary location 13 and first seal position XS1 with a large rate of change to the first seal temperature TS1, e.g. 80 degrees Celsius. Beneath the boundary location 13 or the first seal position XS1, the rate of change is smaller. At the second seal position XS2, the second seal temperature TS2 sinks, for example, to 70 degrees Celsius. Up to the ambient temperature TA at the environment position XA, the temperature T further sinks to about 20 degree Celsius.

At the third seal position XS3, the graphite packing gland is installed, on which almost the complete process temperature TP acts with a third seal temperature TS3 of, for example, 240 degrees Celsius. Due to the high temperature, these seals very near to the process are very disturbance-susceptible.

Elastomers in the temperature range of over 200° C. are not resistant in the long term, and consequently tend very rapidly to exhibit aging phenomena and phenomena indicating lack of sealing.

In the case of graphite packing glands, the problem arises, that especially at high temperatures, the sealing decreases due to permeation of the process medium.

The invention claimed is:

1. An apparatus formed as a measuring device of process automation technology for ascertaining and monitoring a chemical or physical process variable in a process at a temperature greater than 200 degrees Celsius in a container, comprising:
   at least a sensor element located in the process; and
   at least a measurement transmitter located outside the process, wherein:
   at least one temperature sensitive element is provided in said sensor element;
   said sensor element has a boundary location between a sensor element first region, which faces the process and which is embodied with a first thermal resistance, and a sensor element second region, which faces away from the process and which is embodied with a second thermal resistance; and
   said at least one temperature sensitive element is arranged in said sensor element at said boundary location;
   wherein said first thermal resistance is greater than said second thermal resistance, wherein said first thermal resistance in said first region of said sensor element is implemented via a geometry change by reducing a first cross sectional area of said sensor element to such a degree that the sensor element still withstands any process pressures, and said second thermal resistance in said second region of said sensor element is implemented via a geometry change by increasing a second cross sectional area of said sensor element to the extent permitted by pressure and temperature specifications of the sensor element so that an abrupt lowering of the thermal resistance is achieved.

2. The apparatus as claimed in claim 1, wherein:
   at said boundary location, the ratio between said first thermal resistance in said first region of said sensor element and said second thermal resistance in said second region of said sensor element has at least a value of two or greater.

3. The apparatus as claimed in claim 1, wherein:
   said first region and said second region of said sensor element are embodied as a single piece made of a material with a thermal conductivity.

4. The apparatus as claimed in claim 1, wherein:
   said second region of said sensor element and said first region of said sensor element are formed by use of different materials with different thermal conductivities.

5. The apparatus as claimed in claim 1, wherein:
   at least one electrical plugged connection and/or an electronic component is embodied as a temperature sensitive element at said boundary location between said second region of said sensor element and said first region of said sensor element.

6. The apparatus as claimed in claim 1, wherein:
   at least a first sealing element is embodied as a temperature sensitive element at said boundary location between said second region of said sensor element and said first region of said sensor element.

7. The apparatus as claimed in claim 6, wherein:
   a second sealing element is arranged at a distance of a fourth of the wavelength of a microwave measurement signal, which is used in a fill-level measuring device for ascertaining the fill level in said container by means of the travel time from said first sealing element.

8. The apparatus as claimed in claim 6, wherein:
   at least said first sealing element and/or said second sealing element is embodied as an O-ring seal designed for low temperatures of a maximum of 200 degrees Celsius, made of fluorine rubber, fluorocarbon rubber, tetrafluoroethylene and/or perfluoro propylene.

9. The apparatus as claimed in claim 1, wherein:
   said sensor element is embodied as an antenna unit with at least one hollow conductor for determining a fill level of a medium in a container, whose hollow space at least partially is filled by a dielectric filling element, and the sealing elements of said sensor element are embodied between said hollow conductor and said filling element.

10. The apparatus as claimed in claim 9, wherein:
    a third sealing is embodied between an inner wall of the hollow conductor and the filling element.

11. The apparatus as claimed in claim 10, wherein said third sealing element is a graphite packing gland.

12. The apparatus as claimed in claim 1, wherein:
    said sensor element is embodied as a probe unit with at least one measuring probe for determining fill level of a medium in a container, and the sealing elements of said sensor element are embodied between the measuring probe and a coaxial process coupling.

* * * * *